US011393500B1

(12) United States Patent
Kashiwagi et al.

(10) Patent No.: US 11,393,500 B1
(45) Date of Patent: Jul. 19, 2022

(54) MAGNETIC DISK DEVICE AND TRACK SETTING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Kazuto Kashiwagi, Yokohama Kanagawa (JP); Bunpei Ishiguro, Yokohama Kanagawa (JP); Kazuhito Shimomura, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/399,541

(22) Filed: Aug. 11, 2021

(30) Foreign Application Priority Data

Mar. 10, 2021 (JP) .............................. JP2021-038244

(51) Int. Cl.
*G11B 5/56* (2006.01)
*G11B 5/596* (2006.01)
*G11B 5/012* (2006.01)
*G11B 5/09* (2006.01)

(52) U.S. Cl.
CPC .......... *G11B 5/59627* (2013.01); *G11B 5/012* (2013.01); *G11B 5/09* (2013.01)

(58) Field of Classification Search
None
See application file for complete search history.

(56) References Cited

U.S. PATENT DOCUMENTS

| | | | | |
|---|---|---|---|---|
| 9,036,284 | B1* | 5/2015 | Feldman | G11B 20/1217 360/48 |
| 10,424,328 | B1* | 9/2019 | Gaertner | G11B 5/4886 |
| 11,024,337 | B1* | 6/2021 | Aoki | G11B 20/1258 |
| 2010/0128382 | A1* | 5/2010 | Maeda | G11B 5/012 360/75 |
| 2010/0277827 | A1* | 11/2010 | Wood | G11B 5/5552 360/75 |
| 2017/0092311 | A1* | 3/2017 | Qiang | G11B 20/1217 |
| 2018/0322902 | A1* | 11/2018 | Qiang | G11B 20/1217 |
| 2019/0244638 | A1 | 8/2019 | Boyle et al. | |
| 2019/0286568 | A1* | 9/2019 | Shinbori | G06F 12/10 |
| 2020/0279584 | A1 | 9/2020 | Tomoda | |

FOREIGN PATENT DOCUMENTS

JP   2000040202 A   2/2000

* cited by examiner

*Primary Examiner* — Peter Vincent Agustin
(74) *Attorney, Agent, or Firm* — Kim & Stewart LLP

(57) ABSTRACT

According to one embodiment, a magnetic disk device includes a disk, a head, and a controller that sets at least a set of a first target position and a second target position to be matched, among a plurality of the first target positions respectively corresponding to a plurality of first tracks in a case where writing on the first tracks is performed to the first region of the disk in a radial direction of the disk under a first recording mode, and a plurality of the second target positions respectively corresponding to a plurality of second tracks in a case where writing on the second tracks is performed to the first region in the radial direction under a second recording mode different from the first recording mode.

20 Claims, 9 Drawing Sheets

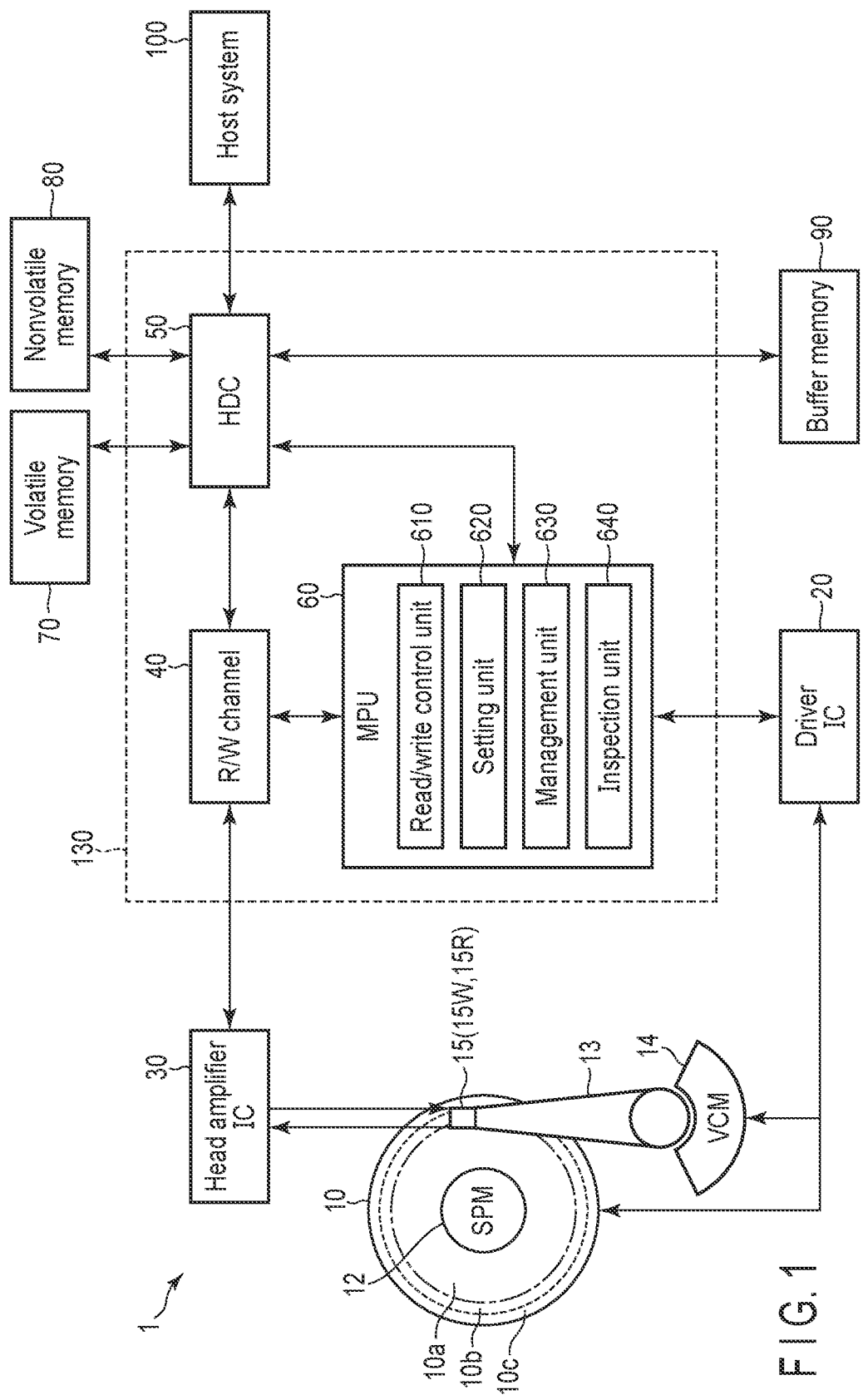
F I G. 1

| M | N | Recording pitch ratio (M/N) | Number of target positions in unshared case (M+N) | Number of target positions in shared case (M+N-1) | Suppression effect (M+N-1)/(M+N) |
|---|---|---|---|---|---|
| 9 | 10 | 90.0% | 19 | 18 | 94.7% |
| 8 | 9 | 88.9% | 17 | 16 | 94.1% |
| 7 | 8 | 87.5% | 15 | 14 | 93.3% |
| 5 | 6 | 83.3% | 11 | 10 | 90.9% |
| 4 | 5 | 80.0% | 9 | 8 | 88.9% |
| 7 | 9 | 77.8% | 16 | 15 | 93.8% |
| 3 | 4 | 75.0% | 7 | 6 | 85.7% |
| 5 | 7 | 71.4% | 12 | 11 | 91.7% |
| 7 | 10 | 70.0% | 17 | 16 | 94.1% |
| 2 | 3 | 66.7% | 5 | 4 | 80.0% |
| 5 | 8 | 62.5% | 13 | 12 | 92.3% |
| 3 | 5 | 60.0% | 8 | 7 | 87.5% |
| 5 | 9 | 55.6% | 14 | 13 | 92.9% |
| 1 | 2 | 50.0% | 3 | 2 | 66.7% |

FIG. 9

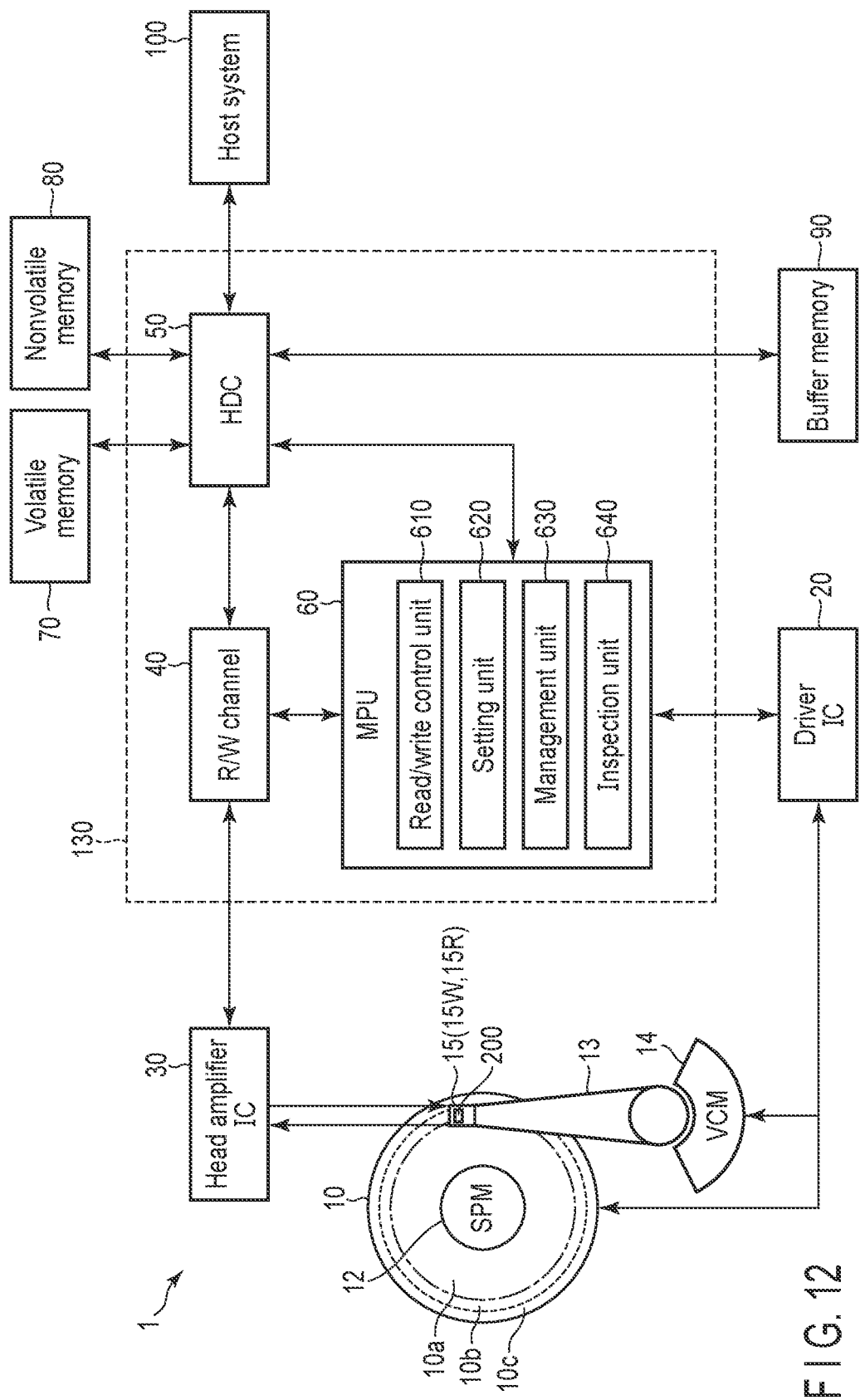
F I G. 12

MAGNETIC DISK DEVICE AND TRACK SETTING METHOD

CROSS-REFERENCE TO RELATED APPLICATIONS

This application is based upon and claims the benefit of priority from Japanese Patent Application No. 2021-038244, filed Mar. 10, 2021, the entire contents of which are incorporated herein by reference.

FIELD

Embodiments described herein relate generally to a magnetic disk device and a track setting method.

BACKGROUND

There are a magnetic disk device of a conventional magnetic recording (Conventional Magnetic Recording (CMR)) mode in which writing is performed on a plurality of tracks at an interval in a radial direction of the disk and a magnetic disk device of a shingled recording (Shingled write Magnetic Recording: SMR, or Shingled Write Recording: SWR) mode in which overwriting is performed on a plurality of tracks in the radial direction of the disk. In recent years, a magnetic disk device capable of selecting and executing a conventional recording mode and a shingled recording mode has been developed. The magnetic disk device capable of selecting and executing the conventional recording mode and the shingled recording mode manages a position of a track for conventional recording and a position of a track for shingled recording. The magnetic disk device capable of selecting and executing the conventional recording mode and the shingled recording mode may execute inspection and calibration on a position of a track for conventional recording and a position of a track for shingled recording.

BRIEF DESCRIPTION OF THE DRAWINGS

FIG. 1 is a block diagram illustrating a configuration of a magnetic disk device according to an embodiment.

FIG. 9 is a schematic diagram illustrating an example of a recording pitch ratio table according to the present embodiment.

FIG. 12 is a block diagram illustrating a configuration of a magnetic disk device according to the first modification.

DETAILED DESCRIPTION

Figure 2:
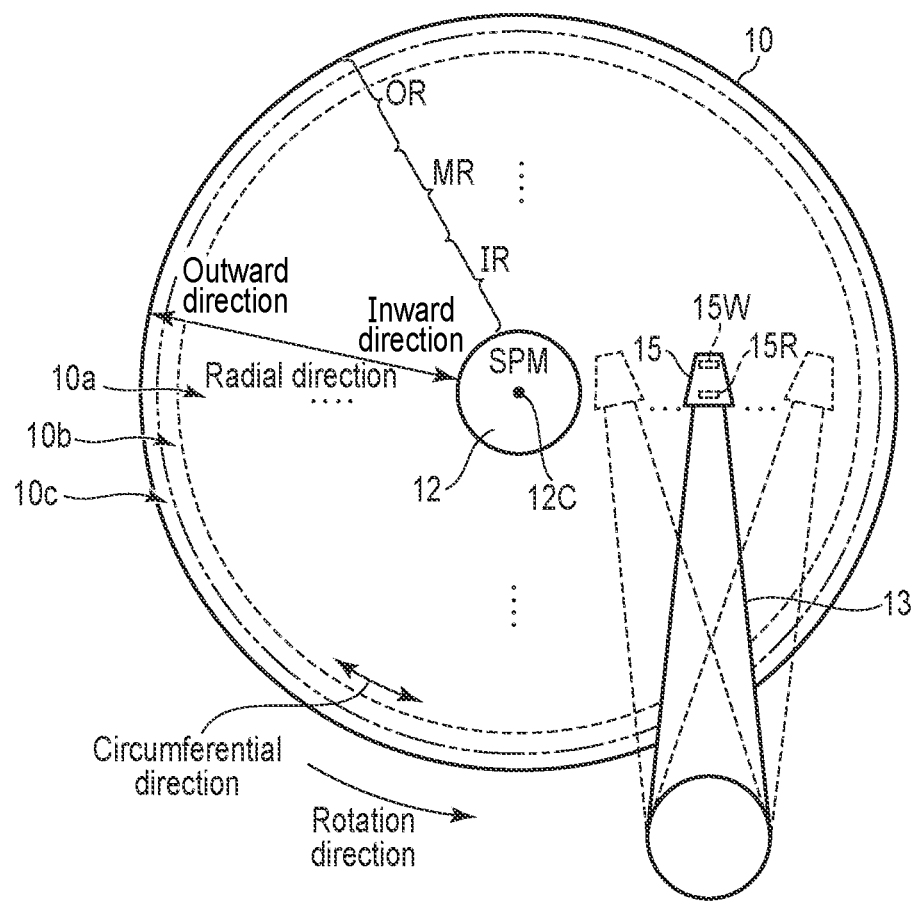
FIG. 2 is a schematic diagram illustrating an example of the disk according to the embodiment.

In general, according to one embodiment, a magnetic disk device comprises: a disk; a head that writes data to the disk and reads data from the disk; and a controller that selects and executes a first recording mode and a second recording mode different from the first recording mode, and sets at least a set of a first target position and a second target position to be matched, among a plurality of the first target positions respectively corresponding to a plurality of first tracks in a case where writing on the first tracks is performed to the first region of the disk in a radial direction of the disk under the first recording mode, and a plurality of the second target positions respectively corresponding to a plurality of second tracks in a case where writing on the second tracks is performed to the first region in the radial direction under the second recording mode.

Hereinafter, embodiments will be described with reference to the drawings. The drawings are merely examples, and do not limit the scope of the invention.

Embodiment

FIG. 1 is a block diagram illustrating a configuration of a magnetic disk device 1 according to an embodiment.

The magnetic disk device 1 includes a head disk assembly (HDA), a driver IC 20, a head amplifier integrated circuit (hereinafter, referred to as a head amplifier IC or a preamplifier) 30, a volatile memory 70, a nonvolatile memory 80, a buffer memory (buffer) 90, and a system controller 130 which is a one-chip integrated circuit, described later. In addition, the magnetic disk device 1 is connected to a host system (hereinafter, simply referred to as host) 100.

The HDA includes a magnetic disk (hereinafter, referred to as a disk) 10, a spindle motor (hereinafter, referred to as SPM) 12, an arm 13 on which a head 15 is mounted, and a voice coil motor (hereinafter, referred to as VCM) 14. The disk 10 is attached to the SPM 12 and is rotated when the SPM 12 is driven. The arm 13 and the VCM 14 form an actuator. The actuator controls movement of the head 15, mounted on the arm 13, to a particular position of the disk 10, when the VCM 14 is driven. The number of the disks 10 and the heads 15 provided may be two or more.

The disk 10 has a data writable region allocated with a user data region 10a available for a user, a media cache (or may be referred to as a media cache region) 10b temporarily holding data (or a command) transferred from the host or the like before the data is written to a particular region of the user data region 10a, and a system area 10c to which information required for system management is written. Note that the disk 10 may not be provided with the media cache 10b. Hereinafter, a direction from the inner circumference toward the outer circumference of the disk 10 or a direction from the outer circumference to the inner circumference of the disk 10 is referred to as a radial direction. In the radial direction, a direction from the inner circumference to the outer circumference is referred to as an outward direction (outer side), and a direction from the outer circumference to the inner circumference is referred to as an inward direction (inner side). A direction orthogonal in the radial direction of the disk 10 is referred to as a circumferential direction. The circumferential direction corresponds to a direction along the circumference of the disk 10. In addition, a particular position in the radial direction of the disk 10 may be referred to as a radial position, and a particular position in the circumferential direction of the disk 10 may be referred to as a circumferential position. The radial position and the circumferential position may be collectively referred to simply as a position. The radial position corresponds to, for example, a distance from the rotation center of the disk 10 to a particular radial position, a distance from the innermost circumference of the disk 10 to a particular radial position, a distance from a particular radial position of the disk 10 to another radial position, or the like. Note that the "track" is used for various meanings including: one of a plurality of regions as a result of dividing the disk 10 in the radial direction; a path of the head 15 at a particular radial position; data extending in the circumferential direction of the disk 10; data of a single cycle written to a track at a particular radial position; data written to a particular track of the disk 10; a part of data written to a particular track of the disk 10; and the like. A "sector" is used for various meanings including: one of a plurality of regions as a result of dividing a particular track of the disk 10 in the circumferential direction; data written to a particular circumferential position at a particular radial position of the disk 10; data written to a particular track or a particular sector of the disk 10; and the like. A "width of a track in the radial direction" may also be referred to as "track width". A "path passing through the center position of the track width in a particular track" is referred to as a "track center". Hereinafter, the "track center of a particular track" may be simply referred to as a "track".

The head 15 has a slider serving as a main body and includes a write head 15W and a read head 15R mounted on the slider. The write head 15W writes data on the disk 10. The read head 15R reads data written to the disk 10. Note that the "write head 15W" may be simply referred to as the "head 15", the "read head 15R" may be simply referred to as the "head 15", or the "write head 15W" and the "read head 15R" may be collectively referred to as the "head 15". The center portion of the "head 15" may be referred to as the "head 15", the center portion of the "write head 15W" may be referred to as the "write head 15W", and the center portion of the "read head 15R" may be referred to as the "read head 15R". The "center portion of the write head 15W" may be simply referred to as the "head 15", or the "center portion of the read head 15R" may be simply referred to as the "head 15". Furthermore, "positioning the center portion of the head 15 at the track center of a particular track" may be expressed as "positioning the head 15 at a particular track", "arranging the head 15 at a particular track", "providing the head 15 at a particular track", or the like.

FIG. 2 is a schematic diagram illustrating an example of the disk 10 according to the present embodiment. FIG. 2 illustrates a center 12C of the SPM 12. The center 12C corresponds to, for example, the rotation center 12C of the disk 10. As illustrated in FIG. 2, in the circumferential direction, a direction in which the disk 10 rotates is referred to as a rotation direction. In the example illustrated in FIG. 2, the rotation direction is illustrated to be the counterclockwise direction, but may be in the opposite direction (clockwise direction). In FIG. 2, the disk 10 is divided into an inner circumferential region IR positioned in the inward direction, an outer circumferential region OR positioned in the outward direction, and a middle circumferential region MR located between the inner circumferential region IR and the outer circumferential region OR.

In the example illustrated in FIG. 2, the disk 10 includes a user data region 10a, a media cache 10b, and a system area 10c. In FIG. 2, the user data region 10a, the media cache 10b, and the system area 10c are arranged in the described order in the outward direction. In FIG. 2, the media cache 10b is disposed adjacent to and on the outer side of the user data region 10a. In other words, the media cache 10b is arranged between the user data region 10a and the system area 10c. This "adjacent" of course includes a case where data pieces, objects, regions, spaces, and the like are arranged side by side while being in contact with each other, but also includes a case where these are arranged with particular gaps in between. In FIG. 2, the system area 10c is arranged adjacent to and is on the outer side of the media cache 10b. Note that the arrangement order of the user data region 10a, the media cache 10b, and the system area 10c is not limited to the order illustrated in FIG. 2, and may be any order. Further, when the media cache 10b is not provided in the disk 10, the system area 10c may be disposed adjacent to and on the outer side of the user data region 10a.

In the example illustrated in FIG. 2, the user data region 10a is arranged from the inner circumferential region IR to the outer circumferential region OR in the radial direction. In the example illustrated in FIG. 2, the media cache 10b is arranged in the outer circumferential region OR in the radial direction. Note that the media cache 10b may be positioned in the inner circumferential region IR or the middle circumferential region MR. Furthermore, the media cache 10b may be positioned to be distributed in the outer circumferential region OR, the middle circumferential region MR, and the inner circumferential region IR. In the example illustrated in FIG. 2, the system area 10c is arranged in the outer circumferential region OR in the radial direction. In other words, the system area 10c is arranged from a particular position of the outer circumferential region OR to the outermost circumference of the disk 10. Note that the system area 10c may be arranged in the middle circumferential region MR or the inner circumferential region IR.

Data may be written to the user data region 10a of the disk 10 under a shingled recording (Shingled write magnetic recording (SMR) or Shingled Write Recording (SWR)) mode of sequentially writing a plurality of tracks with the subsequently written track overwritten on a part of particular track in the radial direction. In the user data region 10a, data may be written under a conventional magnetic recording (or may be referred to as (CMR)) mode in which a track (hereinafter, the track may be referred to as an adjacent track) radially adjacent to a particular track is written at a particular interval in the radial direction from the particular track or data can be randomly written. Hereinafter, "writing data under the shingled recording mode" may be simply referred to as "shingled recording", "performing shingled recording processing", or simply "writing". The write processing other than the "conventional recording processing" may be referred to as "shingled recording processing". Furthermore, "writing data under the conventional recording mode" is simply referred to as "conventional recording", "performing conventional recording processing", or simply "writing".

As illustrated in FIG. 2, driving of the VCM 14 causes the head 15 to rotate about the rotation axis with respect to the disk 10, and the head 15 moves from the inner side toward the outer side to be disposed at a particular position, or the head 15 moves from the outer side toward the inner side to be disposed at a particular position.

The driver IC 20 controls the driving of the SPM 12 and the VCM 14 according to the control of the system controller 130 (specifically, an MPU 60 described later).

The head amplifier IC (preamplifier) 30 includes a read amplifier, a write driver, and the like. The read amplifier amplifies a read signal read from the disk 10 and outputs the amplified read signal to the system controller 130 (specifically, a read/write (R/W) channel 40 described later). The write driver outputs, to the head 15, a write current corresponding to a signal output from the R/W channel 40.

The volatile memory 70 is a semiconductor memory in which stored data is lost when power supply is cut off. The volatile memory 70 stores data and the like necessary for processing in each unit of the magnetic disk device 1. The volatile memory 70 is, for example, a dynamic random access memory (DRAM) or a synchronous dynamic random access memory (SDRAM).

The nonvolatile memory 80 is a semiconductor memory that records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. Note that the buffer memory 90 may be integrated with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is realized by, for example, using a large scale integrated circuit (LSI) called a system-on-a-chip (SoC) in which a plurality of elements are integrated on a single chip. The system controller 130 includes the read/write (R/W) channel 40, a hard disk controller (HDC) 50, and the microprocessor (MPU) 60. The system controller 130 is electrically connected to, for example, the driver IC 20, the head amplifier IC 30, the volatile memory 70, the nonvolatile memory 80, the buffer memory 90, the host system 100, and the like.

The R/W channel 40 performs signal processing on data (hereinafter, may be referred to as read data) transferred from the disk 10 to the host 100 and on data (hereinafter, may be referred to as write data) transferred from the host 100, in response to an instruction from the MPU 60 described later. The R/W channel 40 has a circuit or a function to demodulate write data. The R/W channel 40 has a circuit or function that measures and demodulates the signal quality of the read data. The R/W channel 40 is electrically connected to, for example, the head amplifier IC 30, the HDC 50, the MPU 60, and the like.

The HDC 50 controls data transfer. For example, the HDC 50 controls data transfer between the host 100 and the disk 10 according to an instruction from the MPU 60 to be described later. The HDC 50 is electrically connected to, for example, the R/W channel 40, the MPU 60, the volatile memory 70, the nonvolatile memory 80, the buffer memory 90, and the like.

The MPU 60 is a main controller that controls each unit of the magnetic disk device 1. The MPU 60 controls the VCM 14 through the driver IC 20 and performs servo control for positioning the head 15. The MPU 60 controls the SPM 12 through the driver IC 20 and rotates the disk 10. The MPU 60 controls the operation of writing data to the disk 10 and selects the storage destination of data transferred from the host 100 which is, for example, the write data. In addition, the MPU 60 controls the operation of reading data from the disk 10 and controls the processing of data transferred from the disk 10 to the host 100 which is, for example, read data. The MPU 60 manages a region for recording data.

The MPU 60 is connected to each unit of the magnetic disk device 1. The MPU 60 is electrically connected to, for example, the driver IC 20, the R/W channel 40, the HDC 50, and the like.

The MPU 60 includes a read/write control unit 610, a setting unit 620, a management unit 630, an inspection unit 640, and the like. The MPU 60 performs processing of the units that are, for example, the read/write control unit 610, the setting unit 620, the management unit 630, the inspection unit 640, and the like, on firmware. The MPU 60 may include the units that are, for example, the read/write control unit 610, the setting unit 620, the management unit 630, the inspection unit 640, and the like as a circuit. The read/write control unit 610, setting unit 620, the management unit 630, the inspection unit 640, and the like may be included in the R/W channel 40, the HDC 50, or the like.

The read/write control unit 610 controls read processing of reading data from the disk 10 and write processing of writing data to the disk 10 according to a command or the like from the host 100. The read/write control unit 610 controls the VCM 14 via the driver IC 20, positions the head 15 at a particular position on the disk 10, and performs read processing or write processing. The term "access" includes meanings such as recording or writing data (or write processing) in a particular region, reading out or reading (or read processing) data from a particular region, and moving the head 15 or the like to a particular region of the disk 10.

For example, the read/write control unit 610 performs the write processing under a conventional magnetic recording (CMR) mode in which data is written to a particular track, another track (hereinafter, may be referred to as an adjacent track), or another sector (hereinafter, may be referred to as an adjacent sector) that are separated from the particular sector by a particular gap in the radial direction. The "adjacent track" includes a "track adjacent to the particular track in the outward direction", a "track adjacent to the particular track in the inward direction", and a "plurality of tracks adjacent to the particular track in the outward direction and in the inward direction of". The "adjacent sector" includes a "sector adjacent to the particular sector in the outward direction", a "sector adjacent to the particular sector in the inward direction", and a "plurality of sectors adjacent to the particular sector in the outward direction and the inward direction". Hereinafter, "writing data under the conventional recording mode" may be referred to as "conventional recording", "performing conventional recording processing", or simply "writing". Hereinafter, the "conventional recording track" may be referred to as a "CMR track".

Furthermore, the read/write control unit 610 performs write processing under a shingled recording (Shingled write magnetic recording (SMR) or Shingled Write Recording (SWR)) mode of sequentially writing a plurality of tracks with the subsequently written track overwritten on a part of the previously written track in the radial direction. Hereinafter, "writing data under the shingled recording mode" may be referred to as "shingled recording", "performing shingled recording processing", or simply "writing". Hereinafter, the "shingled recording track" may be referred to as a "SMR track".

The read/write control unit 610 performs the conventional recording processing or the shingled recording processing in accordance with a command from the host 100 or the like. In other words, the read/write control unit 610 selectively performs the conventional recording processing and the shingled recording processing in accordance with a command from the host 100 or the like. Note that the read/write control unit 610 may be configured to perform the conventional recording processing only or may be configured to execute the shingled recording processing only.

Figure 3:
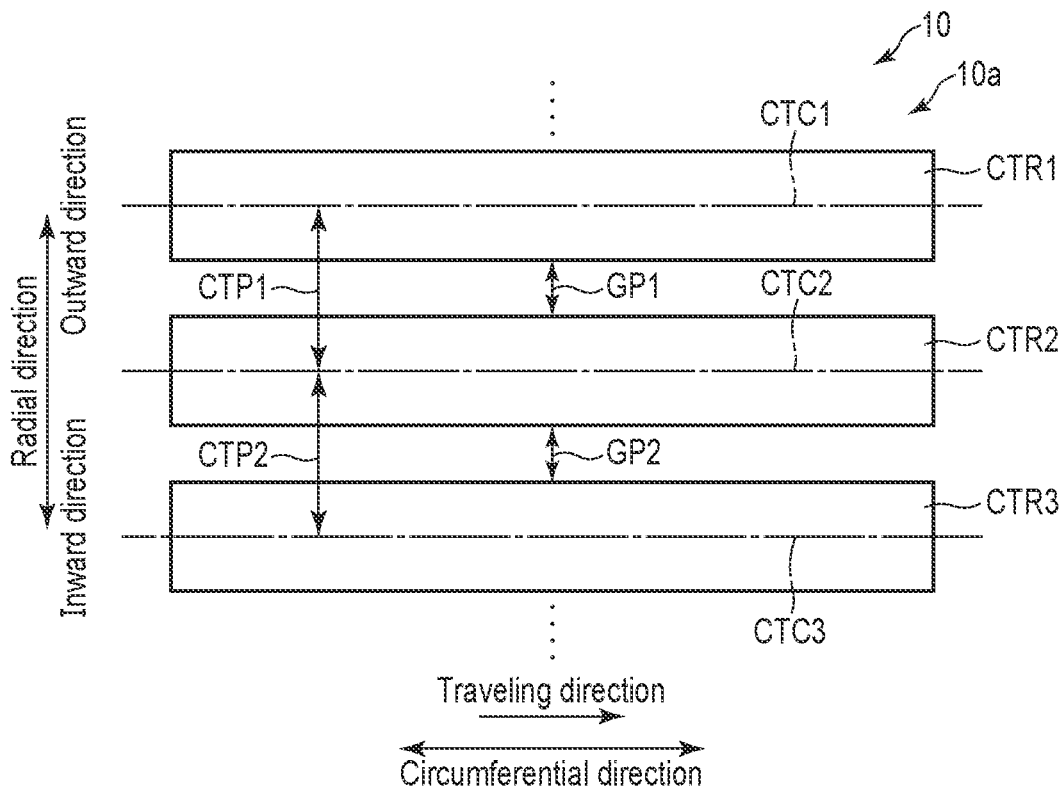
FIG. 3 is a schematic diagram illustrating an example of conventional recording processing.

FIG. 3 is a schematic diagram illustrating an example of the conventional recording processing. FIG. 3 illustrates a traveling direction. A direction in which the head 15 sequentially writes and reads data to and from the disk 10 in the circumferential direction, that is, a direction in which the head 15 travels with respect to the disk 10 in the circumferential direction may be referred to as the traveling direction. For example, the traveling direction is opposite to the rotation direction of the disk 10. The traveling direction may be the same direction as the rotation direction of the disk 10. FIG. 3 illustrates CMR tracks CTR1, CTR2, and CTR3. In FIG. 3, for example, the track widths of the CMR tracks CTR1, CTR2, and CTR3 are the same. Note that the track width may be different among the CMR tracks CTR1 to CTR3. Terms such as "the same", "identical", "matching", and "equivalent" include not only the meaning of being exactly the same but also the meaning of being different to such an extent that they can be regarded as being substantially the same. FIG. 3 illustrates a track center CTC1 of the CMR track CTR1, a track center CTC2 of the CMR track CTR2, and a track center CTC3 of the CMR track CTR3. In the example illustrated in FIG. 3, the CMR tracks CTR1 and CTR2 are written at a track pitch CTP1. The CMR tracks CTR2 and CTR3 are written at the track pitch CTP2. The track center CTC1 of the CMR track CTR1 and the track center CTC2 of the CMR track CTR2 are separated from each other by the track pitch CTP1. The track center CTC2 of the CMR track CTR2 and the track center CTC3 of the track CTR3 are separated from each other by the track pitch CTP2. The track pitches CTP1 and CTP2 may be different or the same. Hereinafter, the track pitch for performing writing on tracks may be referred to as a recording pitch. The CMR track CTR1 and the CMR track CTR2 are separated from each other by the gap GP1. The CMR track CTR2 and the CMR track CTR3 are separated from each other by the gap GP2. The gaps GP1 and GP2 may be different or the same. In FIG. 3, each track is illustrated in a rectangular shape extending in the circumferential direction with a particular track width, but this is for convenience of description, and the track is actually curved along the circumferential direction. In addition, each track may have a wave shape extending in the circumferential direction while varying in the radial direction.

In the example illustrated in FIG. 3, the read/write control unit 610 positions the head 15 in the track center CTC1 at a particular region of the disk 10 that is, for example, the user data region 10a, and performs the conventional recording of the CMR track CTR1 or a particular sector of the CMR track CTR1. In the user data region 10a, the read/write control unit 610 positions the head 15 at the track center CTC2 separated from the track center CTC1 of the CMR track CTR1 in the inward direction by the recording pitch CTP1, and performs the conventional recording of the CMR track CTR2 or a particular sector of the CMR track CTR2. In the user data region 10a, the read/write control unit 610 positions the head 15 at the track center CTC3 separated from the track center CTC2 of the CMR track CTR2 in the inward direction by the recording pitch CTP2, and performs the conventional recording of the CMR track CTR3 or a particular sector of the CMR track CTR3. The read/write control unit 610 may perform the conventional recording of the CMR tracks CTR1, CTR2, and CTR3 sequentially in a particular region of the disk 10 that is, for example, the user data region 10a, or may perform the conventional recording of the CMR tracks CTR1, CTR2, and CTR3 randomly in a particular sector of the CMR track CTR1, a particular sector of the CMR track CTR2, and a particular sector of the CMR track CTR3.

Figure 4:
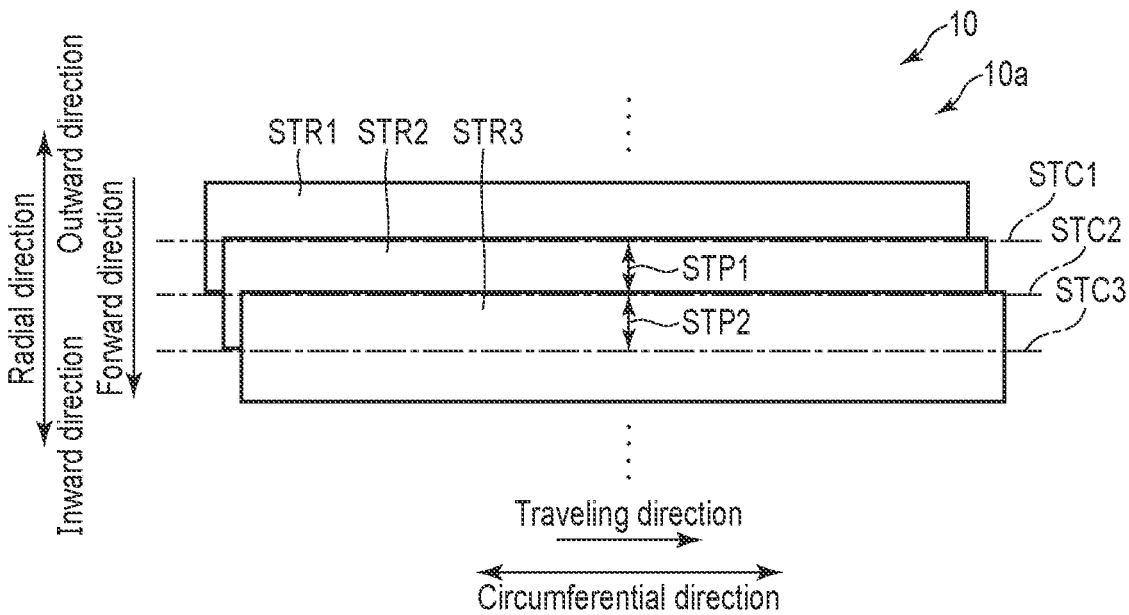
FIG. 4 is a schematic diagram illustrating an example of shingled recording processing.

FIG. 4 is a schematic diagram illustrating an example of the shingled recording processing. FIG. 4 illustrates a forward direction. A direction in which the shingled recording is performed for a plurality of tracks continuously in the radial direction, that is, a direction in which a track to be written next is overlapped with the previously written track written in the radial direction may be referred to as a forward direction. In FIG. 4, the inward direction in the radial direction is the forward direction, but the forward direction may be the outward direction in the radial direction. FIG. 4 illustrates a plurality of SMR tracks STR1, STR2, and STR3 continuously overwritten to one direction in the radial direction. Hereinafter, in the shingled recording, a region in which data is written by the write head 15W may be referred to as a write track, and a remaining region, other than a region in which another write track is overwritten to a particular track may be referred to as a read track. FIG. 4 illustrates a track center STC1 of the SMR track STR1 with no other SMR track overwritten, a track center STC2 of the SMR track STR2 with no other SMR track overwritten, and a track center STC3 of the SMR track STR3 with no other SMR track overwritten. In the example illustrated in FIG. 4, the SMR tracks STR1 and STR2 are written at a track pitch (recording pitch) STP1. The SMR tracks STR2 and STR3 are written at a track pitch (recording pitch) STP2. The track center STC1 of the SMR track (or write track) STR1 and the track center STC2 of the SMR track (or write track) STR2 are separated from each other by the recording pitch STP1. The track center STC2 of the SMR track STR2 and the track center STC3 of the SMR track STR3 are separated from each other by the recording pitch STP2. The recording pitches STP1 and STP2 may be different or the same. In FIG. 4, the width, in the radial direction, of a region (read track) in which the SMR track STR2 is not overwritten to the SMR track STR1 and the width, in the radial direction, of a region (read track) in which the SMR track STR3 is not overwritten to the SMR track STR2 are the same. The width, in the radial direction, of a region (read track) in which the SMR track STR2 is not overwritten to the SMR track STR1 and the width, in the radial direction, of a region (read track) in which the SMR track STR3 is not overwritten to the SMR track STR2 may be different. In FIG. 4, each track is illustrated in a rectangular shape extending in the circumferential direction with a particular track width, but this is for convenience of description, and the track is actually curved along the circumferential direction. In addition, each track may have a wave shape extending in the circumferential direction while varying in the radial direction. In FIG. 4, three tracks are overwritten, but less than three tracks or more than three tracks may be overwritten.

In the example illustrated in FIG. 4, the read/write control unit 610 performs sequential shingled recording of the SMR tracks STR1 to STR3 in the inward direction. The read/write control unit 610 may perform sequential shingled recording of the SMR tracks STR1 to STR3 in the outward direction. The read/write control unit 610 writes the SMR track STR2 at the recording pitch STP1 in the inward direction of the SMR track STR1 and overwrites the SMR track STR2 in a part of the SMR track STR1 in the inward direction. The read/write control unit 610 writes the SMR track STR3 at the recording pitch STP2 in the inward direction of the SMR track STR2 and overwrites the SMR track STR3 in a part of the SMR track STR2 in the inward direction. The read/write control unit 610 may write the SMR track STR2 at the recording pitch STP1 in the outward direction of the SMR track STR1 and overwrites the SMR track STR2 in a part of the SMR track STR1 in the inward direction. The read/write control unit 610 may write the SMR track STR3 at the recording pitch STP2 in the outward direction of the SMR track STR2 and overwrites the SMR track STR3 in a part of the SMR track STR2 in the inward direction.

The setting unit 620 sets a target radial position (hereinafter, may be referred to as a target position or a target track) at which the head 15 is arranged when writing is performed on a particular track. The target position or the target track corresponds to, for example, the track center of a particular track. The setting unit 620 sets a target radial position (hereinafter, may be referred to as a CMR target position, a target CMR track, or a CMR track) at which the head 15 is arranged for conventional recording of a particular CMR track and a target radial position (hereinafter, may be referred to as an SMR target position, a target SMR track, or an SMR track) at which the head 15 is arranged for shingled recording of a particular SMR track. The CMR target position, the target CMR track, or the CMR track corresponds to, for example, the track center of a particular CMR track. The SMR target position, the target SMR track, or the SMR track corresponds to, for example, the track center of a particular SMR track (write track).

For example, the setting unit 620 sets the CMR target position and the SMR target position to be partially shared (or matched). The setting unit 620 sets a plurality of CMR target positions (hereinafter, may be referred to as an unshared CMR target position group or an unshared CMR track group) that respectively correspond to a plurality of CMR tracks in a case of conventional recording in a particular radial region (hereinafter, may be referred to as a radial region) in the radial direction are not shared with (do not match) the SMR target position. The setting unit 620 sets a plurality of SMR target positions (hereinafter, may be referred to as an unshared SMR target position group or an unshared SMR track group) that respectively correspond to a plurality of SMR tracks in a case of shingled recording in a particular radial region are not shared with (do not match) the CMR target position. The setting unit 620 sets a plurality of CMR target positions (hereinafter, may be referred to as a shared CMR target position group or a shared CMR track group) and a plurality of SMR target positions (hereinafter, may be referred to as a shared SMR target position group or a shared SMR track group) in a particular radial region sharing (or matching) the CMR target positions and the SMR target positions that are a part of the unshared CMR target position group and the unshared SMR target position group. Hereinafter, the unshared CMR target position group and the unshared SMR target position group in the particular radial region may be collectively referred to as an unshared target position group, and the shared CMR target position group and the shared SMR target position group in the particular radial region may be collectively referred to as a shared target position group.

The setting unit 620 changes (or sets) the unshared target position group to the shared target position group by changing the track pitch of at least one of the plurality of unshared CMR target position groups and/or the plurality of SMR target position groups in the unshared target position group, for example, the recording pitch so that at least one set of the CMR target position and the SMR target position in the unshared CMR target position group and the unshared SMR target position group is shared (matches).

For example, the setting unit 620 sets the number of ideal CMR target positions (hereinafter, may be simply referred to as the number of CMR target positions) M and the number of ideal SMR target positions (hereinafter, may be simply referred to as the number of SMR target positions) N at an integer ratio of M:N, and sets the CMR target position and the SMR target position to be shared at a ratio of one M+N in a radial region (hereinafter, may be referred to as a target radial region) to be a target of the disk 10 which is, for example, a zone according to the Zoned Constant Density Recording method.

For example, the setting unit 620 calculates an ideal track pitch of the CMR track and calculates an ideal track pitch of the SMR track in the target radial region which is, for example, a zone according to the Zoned Constant Density Recording method. The setting unit 620 selects a combination of the number M of CMR target positions and the number N of SMR target positions achieving the minimum integer ratio closest to the ratio of the ideal track pitch corresponding to the ratio of the ideal track pitch of the SMR track to the ideal track pitch of the CMR track.

For example, the setting unit 620 calculates an ideal recording pitch CTPi [nanometers (nm)] of the CMR track and calculates an ideal recording pitch STPi [nm] of the SMR track in the target radial region which is, for example, a zone according to the Zoned Constant Density Recording method. The setting unit 620 selects a combination of the number M of CMR target positions and the number N of SMR target positions achieving the minimum integer ratio closest to the ratio (hereinafter, may be simply referred to as a recording pitch ratio) (CTPi/STPi) of the ideal recording pitch corresponding to the ratio of the ideal recording pitch of the SMR track to the ideal recording pitch of the CMR track. For example, the setting unit 620 may record a table (hereinafter, may be referred to as a recording pitch ratio table) including the number M of CMR target positions and the number N of SMR target positions in the target radial region and the ideal recording pitch ratio in a particular recording region such as, for example, the disk 10, the volatile memory 70, the nonvolatile memory 80, or the buffer memory 90.

For example, the setting unit 620 may determine the ideal track pitch (for example, the recording pitch) CTPi or bit pitch of the CMR track and the ideal track pitch (for example, the recording pitch) STPi or bit pitch of the SMR track based on head characteristics such as a magnetic write width (MWW), a magnetic erase width (MEW), or a sensitivity width (magnetic read width (MRW)) of the read head 15R of the write head 15W, or through actual measurement of an error rate and/or a signal to noise ratio (SNR).

For example, the setting unit 620 performs setting so as to share the CMR target position and the SMR target position that are close to each other with a distance therebetween being equal to or shorter than a particular distance. The setting unit 620 detects a CMR track (hereinafter, may be referred to as an inner end CMR track) c having the smallest radial position from the unshared CMR target position group (or the unshared CMR track group) of the target radial region and a CMR target position rc of the inner end CMR track c (hereinafter, may be referred to as an inner end CMR target position). The setting unit 620 detects a SMR track (hereinafter, may be referred to as a proximity SMR track) s closest to the inner end CMR track c and a SMR target position (hereinafter, may be referred to as a proximity SMR target position) rs of the proximity SMR track from the unshared SMR target position group (or the unshared SMR track group) of the target radial region. The setting unit 620 compares an absolute value (hereinafter, the difference value may be simply referred to as a difference value) |rc-rs| of a difference value between the inner end CMR target position rc and the proximity SMR target position rs, with a threshold d sharing a preset CMR target position and SMR target position. Upon determining that the difference value |rc-rs| is equal to or less than the threshold d, the setting unit 620 sets a radial position (hereinafter, may be referred to as an intermediate radial position) ((rc+rs)/2) intermediate between the inner end CMR target position rc and the proximity SMR target position rs of the inner end CMR track c and the adjacent SMR track s as a shared target position of the inner end CMR track c and the proximity SMR track s. When determining that the difference value |rc-rs| is equal to or less than the threshold d, the setting unit 620 may set a particular radial position located between the inner end CMR target position rc of the inner end CMR track c and the proximity SMR target position rs of the proximity SMR track s as the shared target position of the inner end CMR track c and the proximity SMR track s. The setting unit 620 detects a CMR target position (hereinafter, may be referred to as a next CMR track) adjacent to and on the outer side of the inner end CMR track and a CMR target position (hereinafter, may be referred to as a next CMR target position) of the next CMR track from the unshared CMR target position group (or the unshared CMR track group) in the target radial region. The setting unit 620 detects a proximity SMR track (hereinafter, may be referred to as a next proximity SMR track) closest to the next CMR track and a SMR target position (hereinafter, may be referred to as a next proximity SMR target position) of the next proximity SMR track from the unshared SMR target position group (or the unshared SMR track group) of the target radial region. The setting unit 620 compares a difference value (hereinafter, may be referred to as the next difference value) between the next CMR target position and the next SMR target position with the threshold d. Upon determining that the next difference value is equal to or smaller than the threshold d, the setting unit 620 sets an intermediate radial position between the target positions of the next CMR track and the next proximity SMR track as the shared target position of the next CMR track and the next proximity SMR track. For example, the setting unit 620 sequentially executes processing similar to the processing described above for all the CMR tracks and the SMR tracks in the target radial region from the CMR track and the SMR track set on the inner side to the CMR track and the SMR track set on the outer side. For example, when the average recording pitch of the SMR tracks is 40 [nm], the threshold d can be set to d=2 [nm] so as to allow deviation of about 5% therefrom.

The management unit 630 manages the CMR target position and the SMR target position. For example, the management unit 630 manages all CMR target positions and SMR target positions on the disk 10. The management unit 630 manages a CMR target position that does not match (or is shared with) the SMR target position, an SMR target position that does not match (or is shared with) the CMR target position, and a CMR target position and an SMR target position that match (or are shared with) the radial position. In other words, the management unit 630 manages information related to a CMR target position that does not match (or is shared with) the SMR target position, information related to an SMR target position that does not match (or is shared with) the CMR target position, and information related to a CMR target position and an SMR target position that match (or are shared with) the radial position. The management unit 630 manages the CMR target positions and the SMR target positions in a form of a list or a table (hereinafter, may be referred to as a management list or a management table), and records the management list or the management table in a particular recording region such as, for example, the disk 10, the volatile memory 70, the nonvolatile memory 80, or the buffer memory 90. In other words, the management unit 630 manages, in a form of a management list or a management table, information related to the CMR target position that does not match (or is shared with) the SMR target position, information related to the SMR target position that does not match (or is shared with) the CMR target position, and information related to the CMR target position and the SMR target position that match (or are shared with) the radial position, and records the management list or the management table in a particular recording region such as, for example, the disk 10, the volatile memory 70, the nonvolatile memory 80, or the buffer memory 90. The management unit 630 has a function of determining, in response to reference using the track number corresponding to the CMR target position (CMR track) and the track number corresponding to the SMR target position (or the SMR track), whether the track referenced based on the management list or the management table is a track sharing or not sharing the radial position. In addition, the management unit 630 records (or holds) calibration result (calibration information) corresponding to the CMR target position and the SMR target position, in the management list or the management table.

The inspection unit 640 executes inspection on all target positions on the disk 10. The inspection unit 640 refers to the management list or the management table and executes inspection on the radial position corresponding only to the SMR target position, the radial position corresponding only to the CMR target position, and the radial positions corresponding to both the CMR target position and the SMR target position. In other words, the inspection unit 640 does not redundantly perform inspection on the radial positions corresponding to both the CMR target position and the SMR target position. The inspection unit 640 records (or holds) an inspection result (or inspection information) for each target position of the disk 10 in the management list or the management table. The inspection and calibration include, for example, detection of repeatable run out (RRO), detection of protrusions on the surface of the disk 10, detection of an error rate, detection of a defect indicating compatibility or incompatibility with final recording and reading, and the like. The inspection result (or inspection information) and the calibration result (or calibration information) include, for example, RRO information, protrusion detection information, error rate information, defect information, and the like.

Figure 5:
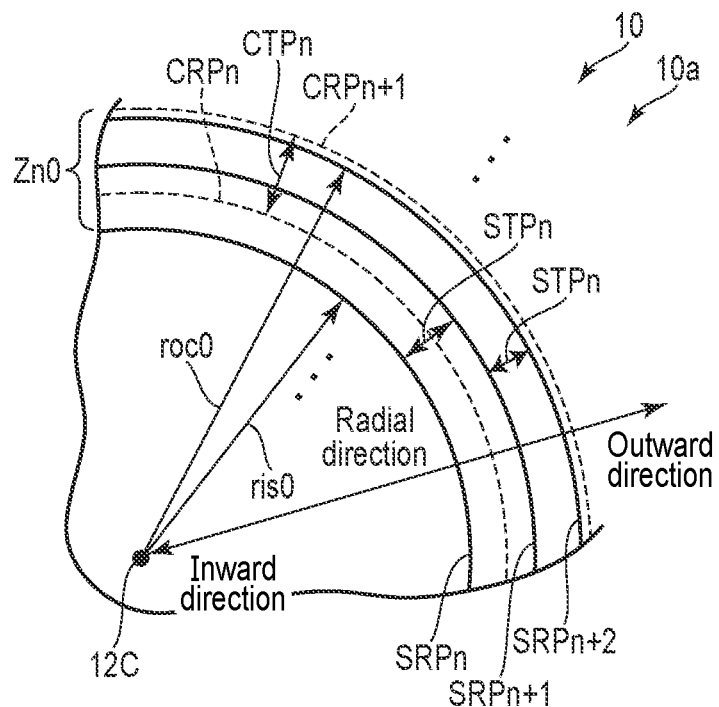
FIG. 5 is a schematic diagram illustrating an example of an unshared target position group in a target radial region.

FIG. 5 is a schematic diagram illustrating an example of an unshared target position group in a target radial region ZnO. In FIG. 5, CMR target positions CRPn and CRPn+1 as well as SMR target positions SRPn, SRPn+1, and SRPn+2 are illustrated in the target radial region ZnO. In FIG. 5, the CMR target position CRPn+1 is located more on the outer side than the CMR target position CRPn at a recording pitch CTPn. In FIG. 5, the CMR target position CRPn is located more on the outer side than the SMR target position SRPn. In FIG. 5, the SMR target position SRPn+1 is located more on the outer side than the SMR target position SRPn by a recording pitch STPn, and the SMR target position SRPn+2 is located more on the outer side than the SMR target position SRPn+1 by the recording pitch STPn. In FIG. 5, the CMR target position CRPn+1 is located more on the outer side than the SMR target position SRPn+2. In FIG. 5, the SMR target position SRPn corresponds to, for example, a distance (hereinafter, may be referred to as an inner end distance) ris0 from the rotation center 12C of the disk 10 or the innermost circumference of the disk 10 to the inner end (hereinafter, may be referred to as an inner end portion) of the target radial region ZnO. In FIG. 5, the CMR target position CRPn+1 corresponds to, for example, a distance (hereinafter, may be referred to as an outer end distance) roc0 from the rotation center 12C of the disk 10 or the innermost circumference of the disk 10 to the outer end (hereinafter, may be referred to as an outer end portion) of the target radial region ZnO. The recording pitch CTPn is longer than the recording pitch STPn.

In the example illustrated in FIG. 5, the MPU 60 sets the CMR target positions CRPn and CRPn+1 at the recording pitch CTPn in the target radial region ZnO. The MPU 60 sets the SMR target positions SRPn, SRPn+1, and SRPn+2 at the recording pitch STPn in the target radial region ZnO. The MPU 60 may the SMR target positions SRPn, SRPn+1, and SRPn+2 at different recording pitches in the target radial region ZnO. The CMR target positions CRPn and CRPn+1 are not shared with (or do not match) the SMR target positions SRPn, SRPn+1, and SRPn+2 in the target radial region ZnO. In the example illustrated in FIG. 5, in the target radial region ZnO, the MPU 60 manages two radial positions CRPn and CRPn+1 corresponding only to the CMR target position and three radial positions SRPn, SRPn+1, and SRPn+2 corresponding only to the SMR target position in a management list or a management table. For example, in the target radial region ZnO, the MPU 60 performs inspection on two radial positions CRPn and CRPn+1 corresponding only to the CMR target position and three radial positions SRPn, SRPn+1, and SRPn+2 corresponding only to the SMR target position.

Figure 6:
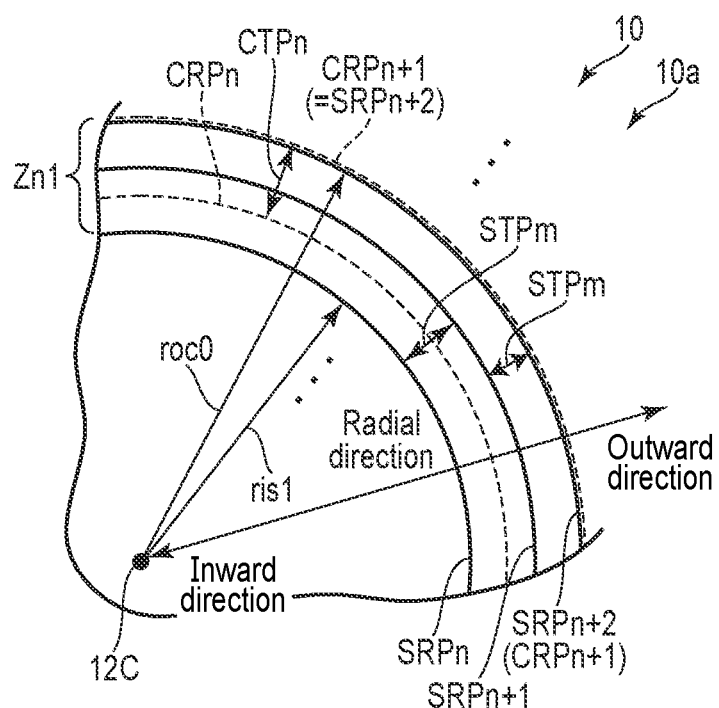
FIG. 6 is a schematic diagram illustrating an example of a shared target position group in the target radial region.

FIG. 6 is a schematic diagram illustrating an example of a shared target position group in a target radial region Zn1. FIG. 6 corresponds to FIG. 5. In FIG. 6, CMR target positions CRPn and CRPn+1 as well as SMR target positions SRPn, SRPn+1, and SRPn+2 are illustrated in the target radial region Zn1. In FIG. 6, the CMR target position CRPn+1 is located more on the outer side than the CMR target position CRPn at a recording pitch CTPn. In FIG. 6, the CMR target position CRPn is located more on the outer side than the SMR target position SRPn. In FIG. 6, the SMR target position SRPn+1 is located more on the outer side than the SMR target position SRPn by a recording pitch STPm, and the SMR target position SRPn+2 is located more on the outer side than the SMR target position SRPn+1 by the recording pitch STPm. In FIG. 6, the CMR target position CRPn+1 and the SMR target position SRPn+2 are located at the same radial position. In FIG. 6, the SMR target position SRPn corresponds to, for example, an inner end distance ris1. In FIG. 6, the CMR target position CRPn+1 (SMR target position SRPn+2) corresponds to, for example, the outer end distance roc0. The recording pitch CTPn is longer than the recording pitch STPm.

In the example illustrated in FIG. 6, the MPU 60 sets the CMR target positions CRPn+1 and the SMR target positions SRPn+2, among the unshared CMR target position groups CRPn and CRPn+1 and the unshared SMR target position groups SRPn, SRPn+1, and SRPn+2, to be shared in the target radial region Zn0 illustrated in FIG. 5. For example, in the target radial region Zn1, the MPU 60 changes the recording pitch STPn of the SMR target positions SRPn, SRPn+1, and SRPn+2 to the recording pitch STPm, and sets the SMR target position SRPn+2 to be matched the CMR target position CRPn+1. The MPU 60 may the SMR target positions SRPn, SRPn+1, and SRPn+2 at different recording pitches in the target radial region Zn1. In the example illustrated in FIG. 6, one of the CMR target positions CRPn and CRPn+1 and one of SMR target positions SRPn, SRPn+1, and SRPn+2 shares the radial position. Thus, in the target radial region Zn1, the MPU 60 manages, using the management list or the management table, one radial position CMRn corresponding only to the CMR target position, two radial positions SRPn and SRPn+1 corresponding only to the SMR target position, and one radial position (CRPn+1=SRPn+2) corresponding to both the CMR target position and the SMR target position. Furthermore, for example, in the target radial region Zn1, the MPU 60 performs inspection on one radial position CMRn corresponding only to the CMR target position, two radial positions SRPn and SRPn+1 corresponding only to the SMR target position, and one radial position (CRPn+1=SRPn+2) corresponding to both the CMR target position and the SMR target position. Thus, with the example illustrated in FIG. 6, one radial position of two CMR target positions and three SMR target positions is shared in the target radial region ZnO, so that the cost required for the MPU 60 to perform management using the management list or the management table and perform inspection in the target radial region Zn0 and the like can be suppressed to be $4/5 \times 100\% = 80\%$ compared with that in the example illustrated in FIG. 5. In other words, with one of the two CMR target positions and the three SMR target positions sharing the radial position in the target radial region ZnO, the MPU 60 can perform the processes in the target radial region Zn0 with the cost reduced by 20%.

Figure 7:
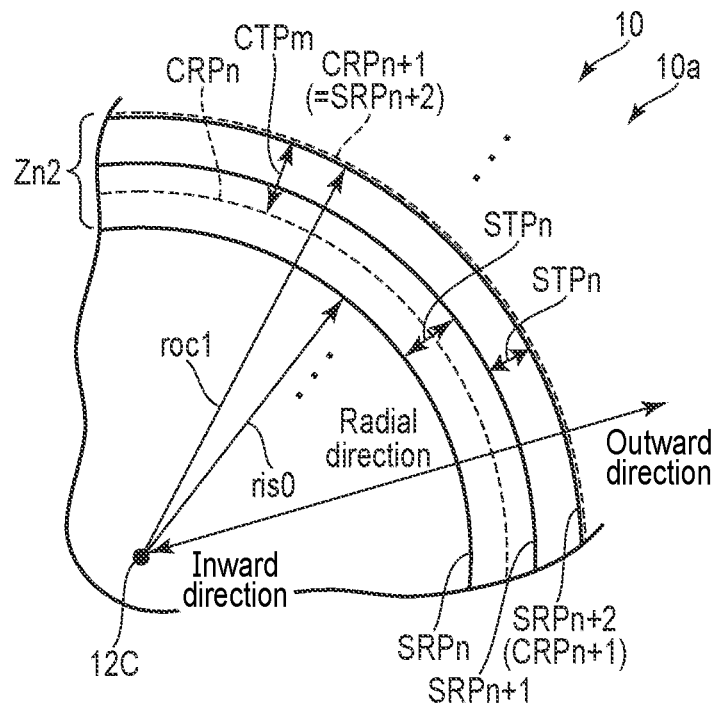
FIG. 7 is a schematic diagram illustrating an example of a shared target position group in the target radial region.

FIG. 7 is a schematic diagram illustrating an example of a shared target position group in a target radial region Zn2. FIG. 7 corresponds to FIG. 5. In FIG. 7, CMR target positions CRPn and CRPn+1 as well as SMR target positions SRPn, SRPn+1, and SRPn+2 are illustrated in the target radial region Zn2. In FIG. 7, the CMR target position CRPn+1 is located more on the outer side than the CMR target position CRPn at a recording pitch CTPm. In FIG. 7, the CMR target position CRPn is located more on the outer side than the SMR target position SRPn. In FIG. 7, the SMR target position SRPn+1 is located more on the outer side than the SMR target position SRPn by a recording pitch STPn, and the SMR target position SRPn+2 is located more on the outer side than the SMR target position SRPn+1 by the recording pitch STPn. In FIG. 7, the CMR target position CRPn+1 and the SMR target position SRPn+2 are located at the same radial position. In FIG. 7, the SMR target position SRPn corresponds to, for example, the inner end distance ris0. In FIG. 7, the CMR target position CRPn+1 (SMR target position SRPn+2) corresponds to, for example, an outer end distance roc1. The recording pitch CTPm is longer than the recording pitch STPn.

In the example illustrated in FIG. 7, the MPU 60 sets the CMR target positions CRPn+1 and the SMR target positions SRPn+2, among the unshared CMR target position groups CRPn and CRPn+1 and the unshared SMR target position groups SRPn, SRPn+1, and SRPn+2, to be shared in the target radial region Zn0 illustrated in FIG. 5. For example, in the target radial region Zn2, the MPU 60 changes the recording pitch CTPn of the CMR target positions CRPn and CRPn+1 to the recording pitch CTPm, and sets the CMR target position CRPn+1 to be matched the SMR target position SRPn+2.

Figure 8:
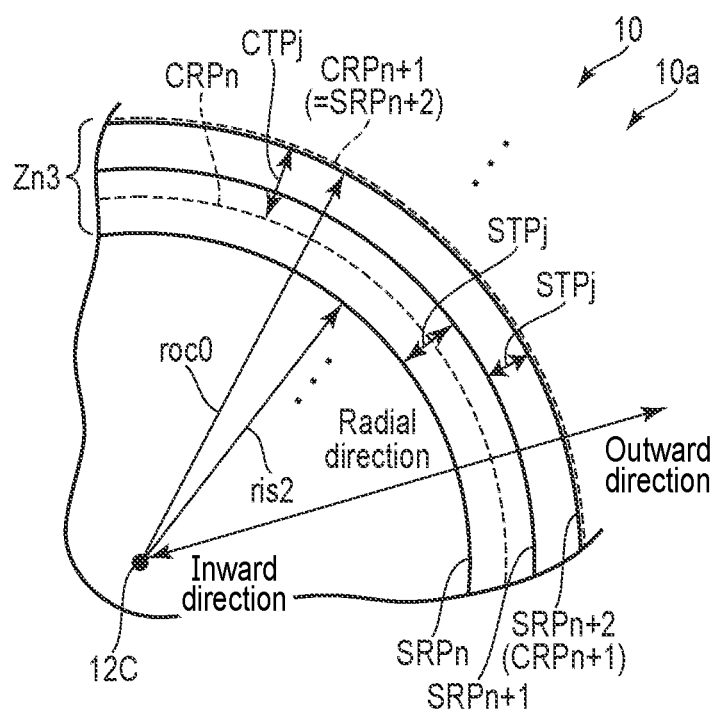
FIG. 8 is a schematic diagram illustrating an example of a shared target position group in the target radial region.

FIG. 8 is a schematic diagram illustrating an example of a shared target position group in a target radial region Zn3. FIG. 8 corresponds to FIG. 5. In FIG. 8, CMR target positions CRPn and CRPn+1 as well as SMR target positions SRPn, SRPn+1, and SRPn+2 are illustrated in the target radial region Zn3. In FIG. 8, the CMR target position CRPn+1 is located more on the outer side than the CMR target position CRPn at a recording pitch CTPj. In FIG. 8, the CMR target position CRPn is located more on the outer side than the SMR target position SRPn. In FIG. 8, the SMR target position SRPn+1 is located more on the outer side than the SMR target position SRPn by a recording pitch STPj, and the SMR target position SRPn+2 is located more on the outer side than the SMR target position SRPn+1 by the recording pitch STPj. In FIG. 8, the CMR target position CRPn+1 and the SMR target position SRPn+2 are located at the same radial position. In FIG. 8, the SMR target position SRPn corresponds to, for example, the inner end distance ris2. In FIG. 8, the CMR target position CRPn+1 (SMR target position SRPn+2) corresponds to, for example, an outer end distance rocs0. The recording pitch CTPj is longer than the recording pitch STPj.

In the example illustrated in FIG. 8, the MPU 60 sets the CMR target positions CRPn+1 and the SMR target positions SRPn+2, among the unshared CMR target position groups CRPn and CRPn+1 and the unshared SMR target position groups SRPn, SRPn+1, and SRPn+2, to be shared in the target radial region Zn0 illustrated in FIG. 5. For example, in the target radial region Zn3, the MPU 60 changes the recording pitch STPn of the SMR target positions SRPn, SRPn+1, and SRPn+2 to the recording pitch STPj, changes the recording pitch CTPn of the CMR target positions CRPn and CRPn+1 to the recording pitch CTPj, and sets the CMR target position CRPn+1 and the SMR target position SRPn+2 to be matched. The MPU 60 may the SMR target positions SRPn, SRPn+1, and SRPn+2 at different recording pitches in the target radial region Zn3.

FIG. 9 is a schematic diagram illustrating an example of a recording pitch ratio table PTB according to the present embodiment. In FIG. 9, the recording pitch ratio table PTB includes the number M of CMR target positions, the number N of SMR target positions, the recording pitch ratio, the number (hereinafter, may be referred to as the number of target positions in the unshared case) of CMR target positions and SMR target positions when the CMR target position and the SMR target position are not shared (or do not match) at all in the target radial region, the number (hereinafter, may be referred to as the number of target positions in the shared case) of CMR target positions and SMR target positions when one of the CMR target position and the SMR target position is shared in the target radial region, and the suppression effect corresponding to the ratio of the number of target positions in the shared case to the number of target positions in the unshared case (hereinafter, may be simply referred to as a suppression effect). Note that the recording pitch ratio table PTB may not include at least one of the number of SMR target positions, the number of CMR target positions, the recording pitch ratio, the number of target positions in the unshared case, the number of target positions in the shared case, and the suppression effect. Furthermore, the recording pitch ratio table PTB may include parameters other than the number of SMR target positions, the number of CMR target positions, the recording pitch ratio, the number of target positions in the unshared case, the number of target positions in the shared case, and the suppression effect.

In the example illustrated in FIG. 9, the MPU 60 calculates an ideal recording pitch CTPi=50 [nm] of the CMR track and calculates an ideal recording pitch STPi=41 [nm] of the SMR track in the target radial region of the disk 10. The MPU 60 calculates a recording pitch ratio of 41/50× 100%=82%. The MPU 60 refers to the recording pitch ratio table PTB, selects 83.3% close to 82% from the recording pitch ratio, and selects the number M=5 of CMR target positions and the number N=6 of SMR target positions corresponding to the recording pitch ratio of 83.3%. The MPU 60 determines the track pitch of the unshared CMR target position group and the track pitch of the unshared SMR target position group to achieve the ratio of 5:6 between the number M of CMR target positions and the number N of SMR target positions in the target radial region. For example, the quality of the CMR track is known to be sensitive to variations in the track pitch compared with the SMR track. In view of this, the MPU 60 changes the ideal recording pitch STPi=41 [nm] of the SMR track to the recording pitch CTPi×5/6=42 [nm] without changing the ideal recording pitch CTPi=50 [nm] of the CMR track. When the track pitch is determined to achieve the ratio of 5:6 between the number M of CMR target positions and the number N of SMR target positions, the CMR target positions and the SMR target positions share one radial position in the target radial region from the recording pitch ratio table PTB, and the suppression effect of 90.9% is achieved. Thus, the cost can be reduced by 9.1%.

The MPU 60 sets the innermost (or outer) target position in the target radial region to a radial position corresponding to both the CMR target position and the SMR target position, sets four CMR target positions that do not coincide with the SMR target position outside (or inside) the innermost (or outermost) target position at a recording pitch 42 [nm], and sets five SMR target positions that do not coincide with the CMR target position outside (or inside) the innermost (or outer) target position at a recording pitch 50 [nm]. The MPU 60 sets a radial position corresponding only to the CMR target position, a radial position corresponding only to the SMR target position, and a radial position corresponding to both the CMR target position and the SMR target position in all the areas of the user data region 10a of the disk 10, as in this radial region.

Figure 10:
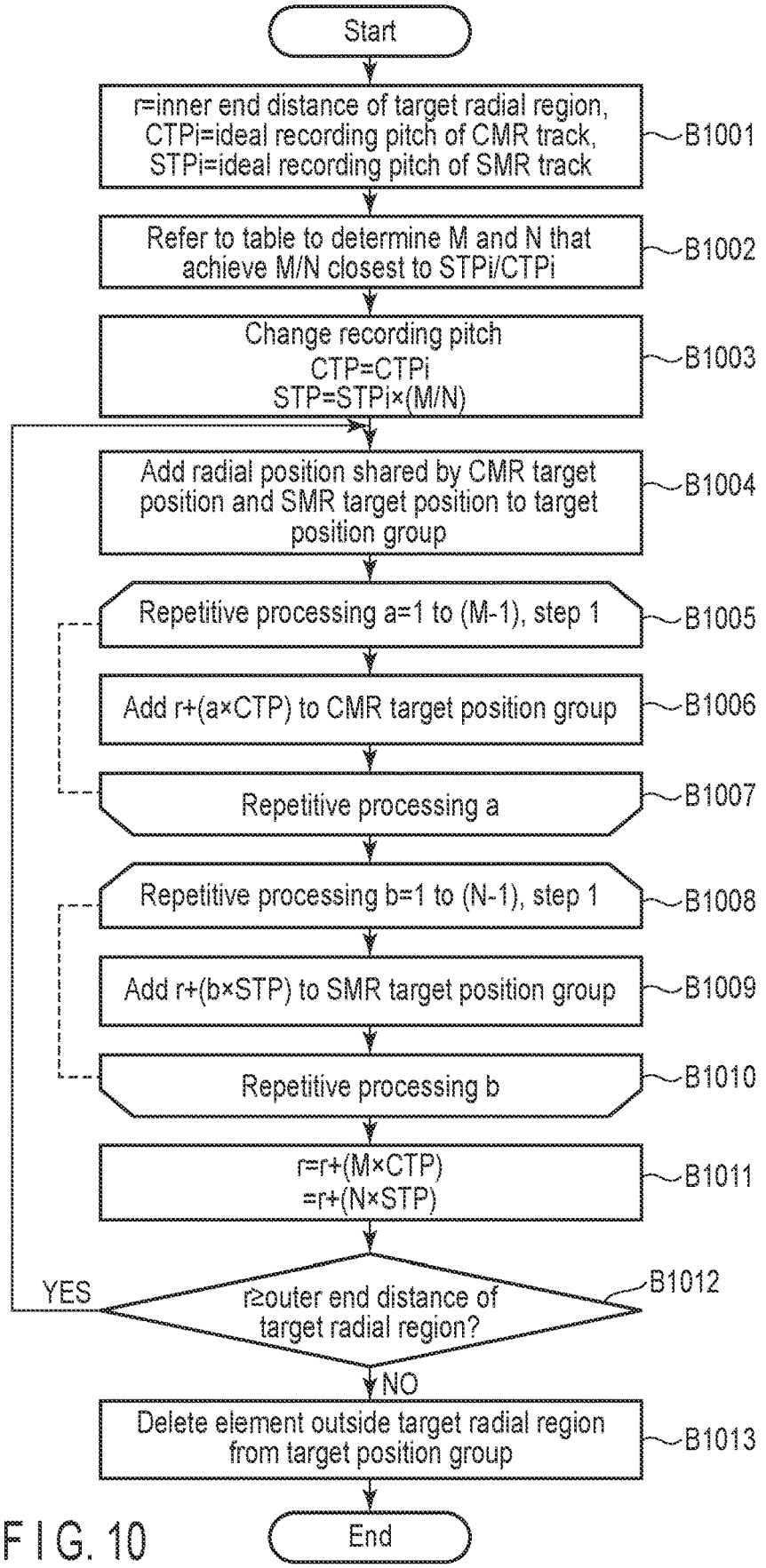
FIG. 10 is a flowchart illustrating an example of a track setting method in the target radial region according to the present embodiment.

FIG. 10 is a flowchart illustrating an example of a track setting method in the target radial region according to the present embodiment.

The MPU 60 sets r=inner end distance of the target radial region, CTPi=ideal recording pitch of the CMR track, and STPi=ideal recording pitch of the SMR track (B1001). The MPU 60 refers to the recording pitch ratio table PTB to determine the number M of CMR target positions and the number N of SMR target positions and achieve M/N closest to the recording pitch ratio (STPi/CTPi) (B1002). The MPU 60 changes the ideal recording pitch of the SMR track to the recording pitch STP of the SMR track=STPi×(M/N) without changing the ideal recording pitch CTP=CTPi of the CMR track (B1003). The MPU 60 adds a radial position shared by the CMR target position and the SMR target position to the target position group (B1004).

The MPU 60 starts the repetitive processing a=1 to (M−1) from Step 1 (B1005), adds r+(a×CTP) to the CMR target position group (B1006), and repeats the processing of B1005 and B1007 until the repetitive processing a terminates (B1007).

The MPU 60 starts the repetitive processing b=1 to (N−1) from Step 1 (B1008), adds r+(b×STP) to the CMR target position group (B1006), and repeats the processing of B1008 and B1009 until the repetitive processing b terminates (B1010).

The MPU 60 calculates r=r+(M×CTP)=r+(N×STP) (B1011). The MPU 60 determines whether r the outer end distance of the target radial region holds or r<the outer end distance of the target radial region holds (B1012). When it is determined that r the outer end distance of the target radial region holds (YES in B1012), the MPU 60 proceeds to B1004. When it is determined that r<the outer end distance of the target radial region holds (NO in B1012), the MPU 60 deletes the element outside the target radial region from the target position group (B1013), and terminates the processing.

Figure 11:
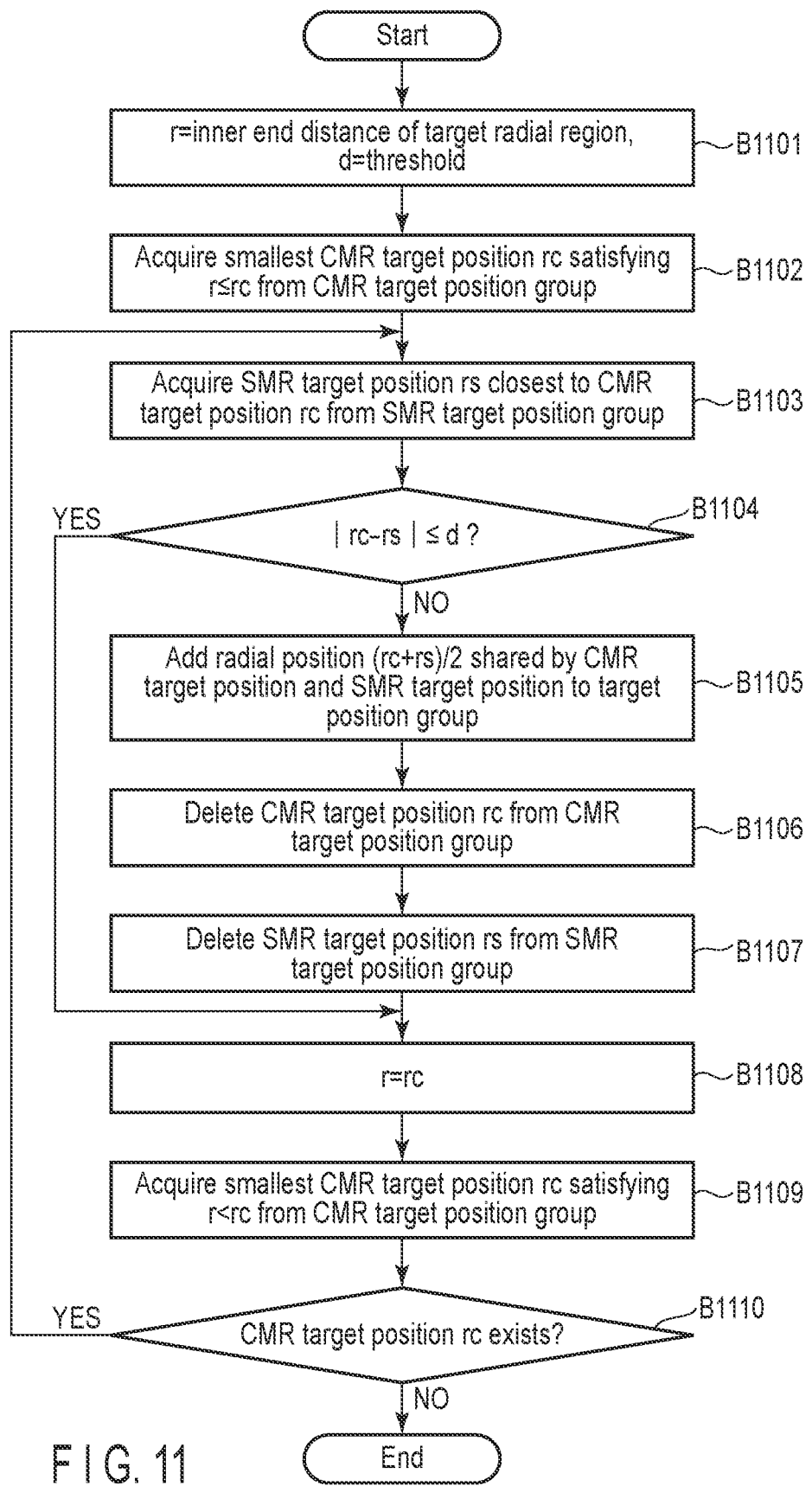
FIG. 11 is a flowchart illustrating an example of a track setting method in the target radial region according to the present embodiment.

FIG. 11 is a flowchart illustrating an example of a track setting method in the target radial region according to the present embodiment.

The MPU 60 sets r=the inner end distance of the target radial region and d=the threshold (B1101). The MPU 60 acquires the smallest CMR target position rc satisfying r rc from the CMR target position group (B1102). In other words, the MPU 60 acquires the CMR track c corresponding to the smallest CMR target position rc satisfying r rc from the CMR track group. The MPU 60 acquires the SMR target position rs closest to the CMR target position rc from the SMR target position group (B1103). In other words, the SMR track s corresponding to the SMR target position rs closest to the CMR target position rc is acquired from the SMR track group.

The MPU 60 determines whether the difference value |rc-rs|≤d holds or the difference value |rc-rs|>d holds (B1104). When it is determined that the difference value |rc-rs|≤d holds (YES in B1104), the MPU 60 proceeds to B1108. When it is determined that the difference value |rc-rs|>d holds (NO in B1104), the MPU 60 adds a radial position shared by the CMR target position and the SMR target position, for example, (rc+rs)/2 to the target position group (B1105). In other words, the MPU 60 adds the track corresponding to the radial position shared by the CMR target position and the SMR target position, for example, (rc+rs)/2, to the target track group. The MPU 60 deletes the CMR target position rc from the CMR target position group (B1106), and deletes the SMR target position rs from the SMR target position group (B1107). In other words, the MPU 60 deletes the CMR track c corresponding to the CMR target position rc from the CMR track group, and deletes the SMR track corresponding to the SMR target position rs from the SMR track group.

The MPU 60 sets r=rc (B1108). The MPU 60 acquires the smallest CMR target position rc satisfying r<rc from the CMR target position group (B1109). In other words, the MPU 60 acquires the track corresponding to the smallest CMR target position rc satisfying r<rc from the CMR track group.

The MPU 60 determines whether the CMR target position rc exists in the management list, the management table, or the like (B1110). When it is determined that the CMR target position rc exists in the management list, the management table, or the like (YES in B1110), the MPU 60 proceeds to B1103. When it is determined that the CMR target position rc does not exist in the management list, the management table, or the like (NO in B1110), the MPU 60 terminates the processing.

According to the embodiment, the unshared target position group is changed (or set) to the shared target position group by changing the track pitch of at least one of the plurality of unshared CMR target position groups and/or the plurality of SMR target position groups in the unshared target position group, for example, the recording pitch so that at least one set of the CMR target position and the SMR target position in the unshared CMR target position group and the unshared SMR target position group is shared (matches). Therefore, with the magnetic disk device 1, a management cost for managing the target position of each track, an inspection cost for inspecting at each target position of each track, a cost for executing calibration in each track, and the like can be reduced. Therefore, the magnetic disk device 1 can improve the management performance.

Next, a magnetic disk device according to other embodiments and other modifications of the above-described embodiment will be described. In other embodiments and other modifications, the same parts as those in the above-described embodiments are denoted by the same reference numerals, and the detailed description thereof will be omitted.

(First Modification)

A magnetic disk device 1 of a first modification is different from the magnetic disk device 1 of the above-described embodiment in that an assist function is provided.

FIG. 12 is a block diagram illustrating a configuration of the magnetic disk device 1 according to the first modification.

The magnetic disk device 1 according to the first modification is, for example, a magnetic disk device of a high frequency assisted recording mode (or a microwave assisted mode), a magnetic disk device of a thermally assisted magnetic recording (TAMR) mode, or the like.

A head 15 includes an assist element 200. In a case where the magnetic disk device 1 is a high frequency assisted recording mode magnetic disk device, the assist element 200 includes, for example, a spin torque oscillator (STO) that applies a high-frequency magnetic field (microwave) to the disk 10. Furthermore, in a case where the magnetic disk device 1 is a thermally assisted magnetic recording mode magnetic disk device, the assist element 200 includes, for example, a light generating element (for example, a laser diode), a near-field light irradiation element (plasmon generator, near-field transducer) that emits near-field light to the disk 10, and a waveguide that propagates light generated by the light generating element to the near-field light irradiation element.

For example, the head amplifier IC 30 supplies a current and a voltage to the assist element 200 under the control by the MPU 60.

The MPU 60 supplies a current and a voltage to the assist element 200, and writes data in accordance with the energy assist recording mode (the thermally assisted mode, the microwave assisted mode, or the like) for outputting energy (a high-frequency magnetic field, near-field light, or the like) to the disk 10.

For example, in the target radial region, the MPU 60 performs setting so that a plurality of target radial positions (or a plurality of tracks) when writing is performed on tracks with high density by the energy assisted recording mode and a plurality of CMR target radial positions (or a plurality of CMR tracks) when writing is performed on tracks with the conventional recording mode in such cases where the use of the assist element 200 is interrupted at the time of failure of the assist element 200 or in order to secure the life are partially shared.

According to the first modification, in the target radial region, the magnetic disk device 1 performs setting so that a plurality of target radial positions when writing is performed on tracks at high density by the energy-assisted recording and a plurality of CMR target radial positions when writing is performed on tracks by the conventional recording mode are partially shared. Therefore, the magnetic disk device 1 can improve the management performance.

An example of a magnetic disk device obtained from the configuration and a track setting method disclosed in the present specification will be noted below.

(1)
A magnetic disk device including:
a disk;
a head that writes data to the disk and reads data from the disk; and
a controller that selects and executes a first recording mode and a second recording mode different from the first recording mode, and sets at least one set of a first target position and a second target position to be matched, among a plurality of the first target positions respectively corresponding to a plurality of first tracks in a case where writing on the first tracks is performed to the first region of the disk in a radial direction of the disk under the first recording mode, and a plurality of the second target positions respectively corresponding to a plurality of second tracks in a case where writing on the second tracks is performed to the first region in the radial direction under the second recording mode.

(2)
The magnetic disk device according to (1), wherein the first recording mode is a conventional recording mode in which writing is performed on tracks at an interval in the radial direction, and the second recording mode is a shingled recording mode in which writing is performed on tracks in an overlapping manner in the radial direction.

(3) The magnetic disk device according to (1) or (2), wherein when writing is performed on tracks corresponding to a sum of the first target positions and the second target positions in the first region, the controller makes the first target position and the second target position match at a ratio of one of numbers of target positions to be targets.

(4)
The magnetic disk device according to (1) or (2), wherein the controller sets at least one set of the first target position and the second target position arranged at a distance in the radial direction equal to or less than a threshold to be matched in the first region among the first target positions and the second target positions.

(5)
The magnetic disk device according to any one of (1) to (4), wherein the controller holds first information on at least one third target position that does not match the second target position among the first target positions, second information on at least one fourth target position that does not match the first target position among the second target positions, and third information on at least one fifth target position where the first target position and the second target position among the first target positions and the second target positions are matched.

(6)
The magnetic disk device according to (5), wherein the controller executes inspection and calibration for the third target position, the fourth target position, and the fifth target position.

(7)
The magnetic disk device according to (6), wherein the controller holds first inspection and calibration information corresponding to a result of execution of inspection and calibration corresponding to the first information, second inspection and calibration information corresponding to a result of execution of inspection and calibration corresponding to the second information, and third inspection and calibration information corresponding to a result of execution of inspection and calibration corresponding to the third information.

(8)
The magnetic disk device according to (7), wherein the first inspection and calibration information, the second inspection and calibration information, and the third inspection and calibration information include RRO information, information on a protrusion on a surface of the disk, error rate information, and information on a defect of the disk.

(9)
The magnetic disk device according to (1), wherein
the first recording mode is a conventional recording mode in which writing is performed on tracks at an interval in the radial direction, and the second recording mode is an energy assisted recording mode in which data is written with energy output to the disk.

(10)
A magnetic disk device including:
a disk that includes a first region, in which at least one set of a first target position and a second target position, of a plurality of first tracks respectively arranged at a plurality of the first target positions in a radial direction of the disk in the first region and a plurality of second tracks respectively arranged at a plurality of the second target positions in the radial direction in the first region, match;
a head that writes data to the disk and reads data from the disk; and
a controller that selects and executes a first recording mode and a second recording mode different from the first recording mode.

(11)
A track setting method applied to a magnetic disk device including a disk, and a head that writes data to the disk and reads data from the disk, the track setting method including:
selecting and executing a first recording mode and a second recording mode different from the first recording mode; and
setting at least one set of a first target position and a second target position, among a plurality of the first target positions respectively corresponding to a plurality of first tracks in a case where writing on the first tracks is performed to the first region of the disk in a radial direction of the disk under the first recording mode, and a plurality of the second target positions respectively corresponding to a plurality of second tracks in a case where writing on the second tracks is performed to the first region in the radial direction under the second recording mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a disk;
a head that writes data to the disk and reads data from the disk; and
a controller that selects and executes a first recording mode and a second recording mode different from the first recording mode, and sets at least a set of a first target position and a second target position to be matched, among a plurality of first target positions respectively corresponding to a plurality of first tracks in a case where writing on the first tracks is performed to a first region of the disk in a radial direction of the disk under the first recording mode, and a plurality of second target positions respectively corresponding to a plurality of second tracks in a case where writing on the second tracks is performed to the first region in the radial direction under the second recording mode.

2. The magnetic disk device according to claim 1, wherein
the first recording mode is a conventional recording mode in which writing is performed on tracks at an interval in the radial direction, and
the second recording mode is a shingled recording mode in which writing is performed on tracks in an overlapping manner in the radial direction.

3. The magnetic disk device according to claim 1, wherein when writing is performed on tracks corresponding to a sum of the first target positions and the second target positions in the first region, the controller makes the first target position and the second target position match at a ratio of one of numbers of target positions to be targets.

4. The magnetic disk device according to claim 1, wherein the controller sets at least a set of the first target position and the second target position arranged at a distance in the radial direction equal to or less than a threshold to be matched in the first region among the first target positions and the second target positions.

5. The magnetic disk device according to claim 1, wherein the controller holds first information on at least a third target position that does not match the second target position among the first target positions, second information on at least a fourth target position that does not match the first target position among the second target positions, and third information on at least a fifth target position where the first target position and the second target position among the first target positions and the second target positions are matched.

6. The magnetic disk device according to claim 5, wherein the controller executes inspection and calibration for the third target position, the fourth target position, and the fifth target position.

7. The magnetic disk device according to claim 6, wherein the controller holds first inspection and calibration information corresponding to a result of execution of inspection and calibration corresponding to the first information, second inspection and calibration information corresponding to a result of execution of inspection and calibration corresponding to the second information, and third inspection and calibration information corresponding to a result of execution of inspection and calibration corresponding to the third information.

8. The magnetic disk device according to claim 7, wherein the first inspection and calibration information, the second inspection and calibration information, and the third inspection and calibration information include RRO information, information on a protrusion on a surface of the disk, error rate information, and information on a defect of the disk.

9. The magnetic disk device according to claim 1, wherein
the first recording mode is a conventional recording mode in which writing is performed on tracks at an interval in the radial direction, and
the second recording mode is an energy assisted recording mode in which data is written with energy output to the disk.

10. A magnetic disk device comprising:
a disk that includes a first region, in which at least a set of a first target position and a second target position, of a plurality of first tracks respectively arranged at a plurality of first target positions in a radial direction of the disk in the first region and a plurality of second tracks respectively arranged at a plurality of second target positions in the radial direction in the first region, is matched;
a head that writes data to the disk and reads data from the disk; and
a controller that selects and executes a first recording mode and a second recording mode different from the first recording mode.

11. The magnetic disk device according to claim 10, wherein
the first recording mode is a conventional recording mode in which writing is performed on tracks at an interval in the radial direction, and
the second recording mode is a shingled recording mode in which writing is performed on tracks in an overlapping manner in the radial direction.

12. A track setting method applied to a magnetic disk device comprising a disk, and a head that writes data to the disk and reads data from the disk, the track setting method comprising:
selecting and executing a first recording mode and a second recording mode different from the first recording mode; and
setting at least a set of a first target position and a second target position to be matched, among a plurality of first target positions respectively corresponding to a plurality of first tracks in a case where writing on the first tracks is performed to a first region of the disk in a radial direction of the disk under the first recording mode, and a plurality of second target positions respectively corresponding to a plurality of second tracks in a case where writing on the second tracks is performed to the first region in the radial direction under the second recording mode.

13. The track setting method according to claim 12, wherein
the first recording mode is a conventional recording mode in which writing is performed on tracks at an interval in the radial direction, and
the second recording mode is a shingled recording mode in which writing is performed on tracks in an overlapping manner in the radial direction.

14. The track setting method according to claim 12, wherein when writing is performed on tracks corresponding to a sum of the first target positions and the second target positions in the first region, the first target position and the second target position are made to be matched at a ratio of one of numbers of target positions to be targets.

15. The track setting method according to claim 12, further comprising:
setting at least a set of the first target position and the second target position arranged at a distance in the radial direction equal to or less than a threshold to be matched in the first region among the first target positions and the second target positions.

16. The track setting method according to claim 12, further comprising:
holding first information on at least a third target position that does not match the second target position among the first target positions, second information on at least a fourth target position that does not match the first target position among the second target positions, and third information on at least a fifth target position where the first target position and the second target position among the first target positions and the second target positions are matched.

17. The track setting method according to claim 16, wherein further comprising:
    executing inspection and calibration for the third target position, the fourth target position, and the fifth target position.

18. The track setting method according to claim 17, further comprising:
    holding first inspection and calibration information corresponding to a result of execution of inspection and calibration corresponding to the first information, second inspection and calibration information corresponding to a result of execution of inspection and calibration corresponding to the second information, and third inspection and calibration information corresponding to a result of execution of inspection and calibration corresponding to the third information.

19. The track setting method according to claim 18, wherein the first inspection and calibration information, the second inspection and calibration information, and the third inspection and calibration information include RRO information, information on a protrusion on a surface of the disk, error rate information, and information on a defect of the disk.

20. The track setting method according to claim 12, wherein
    the first recording mode is a conventional recording mode in which writing is performed on tracks at an interval in the radial direction, and
    the second recording mode is an energy assisted recording mode in which data is written with energy output to the disk.

* * * * *